United States Patent
Qiao et al.

(10) Patent No.: US 11,841,928 B2
(45) Date of Patent: Dec. 12, 2023

(54) SECURE COLLABORATION MESSAGING

(71) Applicant: Citrix Systems, Inc., Fort Lauderdale, FL (US)

(72) Inventors: Zongpeng Qiao, Nanjing (CN); Dan Hu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 530 days.

(21) Appl. No.: 17/170,146

(22) Filed: Feb. 8, 2021

(65) Prior Publication Data

US 2022/0197979 A1 Jun. 23, 2022

Related U.S. Application Data

(63) Continuation of application No. PCT/CN2020/137169, filed on Dec. 17, 2020.

(51) Int. Cl.
*G06F 21/10* (2013.01)
*H04L 65/60* (2022.01)
*G06F 3/14* (2006.01)
*H04L 67/10* (2022.01)

(52) U.S. Cl.
CPC ............... *G06F 21/10* (2013.01); *G06F 3/14* (2013.01); *H04L 65/60* (2013.01); *G06F 21/1062* (2023.08); *H04L 67/10* (2013.01)

(58) Field of Classification Search
CPC ........ G06F 21/10; G06F 3/14; G06F 21/1062; H04L 65/60; H04L 67/10
See application file for complete search history.

(56) References Cited

U.S. PATENT DOCUMENTS

| | | | | |
|---|---|---|---|---|
| 8,850,569 | B1* | 9/2014 | Huang | G06F 21/54 726/22 |
| 11,755,692 | B2* | 9/2023 | Ur | H04N 7/15 348/14.12 |
| 2015/0178502 | A1* | 6/2015 | Shin | H04L 51/04 726/26 |
| 2016/0294787 | A1* | 10/2016 | Moore | H04L 63/102 |

(Continued)

FOREIGN PATENT DOCUMENTS

| | | |
|---|---|---|
| CN | 101958977 A | 1/2011 |
| CN | 103379451 A | 10/2013 |
| CN | 105119799 A | 12/2015 |
| CN | 107846345 A | 3/2018 |

(Continued)

OTHER PUBLICATIONS

IP.com "A method to automatically manage mobile phone text messages," IP.com, IPCOM000241741D, May 27, 2015. (Year: 2015).*

(Continued)

*Primary Examiner* — Peter C Shaw

(57) ABSTRACT

Techniques are disclosed for secure collaboration messaging. An example methodology implementing the techniques includes, by a computing device of a first user, receiving a notification of arrival of a message addressed to the first user from a second user and determining that the message is a secure message. The method also includes, by the computing device of the first user, associating a security tag icon to the message, the security tag icon providing an indication that the message is a secure message, and causing a display of the associated security tag icon with a displayed indication of the arrival of the message.

11 Claims, 14 Drawing Sheets

(56) References Cited

U.S. PATENT DOCUMENTS

2017/0012917 A1    1/2017  Yang
2020/0112536 A1    4/2020  McMichael
2022/0197979 A1*  6/2022  Qiao ................. H04L 63/20

FOREIGN PATENT DOCUMENTS

| | | | | |
|---|---|---|---|---|
| CN | 107911368 A | * | 4/2018 | ........... H04L 51/043 |
| CN | 109274582 A | * | 1/2019 | ........... H04L 51/043 |
| CN | 112187625 A | * | 1/2021 | |
| KR | 101695923 B1 | * | 1/2017 | |

OTHER PUBLICATIONS

IP.com "A push system for content based identification and deletion of messages on mobile phones," IP.com, IPCOM000243757D, Oct. 16, 2015. (Year: 2015).*

Buxton, "Automatic deletion of text message in message store when receiving message from same source number," IP.com, IPCOM000159854D, Oct. 31, 2007. (Year: 2007).*

Yanhong et al., "Design and implementation of high-performance instant messaging system and personalized aggregate content service," Dalian, China, 2022, pp. 84-89, doi: 10.1109/IPEC54454. 2022.9777555. (Year: 2022).*

International Search Report and Written Opinion issued in PCT/CN2020/137169, dated Aug. 26, 2021, 9 pages.

Kaushal, "How to Send Self-Destructing Messages on Slack," TechWiser, dated Jan. 11, 2019, 11 pages.

Shred, "Self-Destructing Messaging for Slack & Email," https://shred.me/, printed on Oct. 19, 2020, 6 pages.

\* cited by examiner

SECURE COLLABORATION MESSAGING

CROSS REFERENCE TO RELATED APPLICATION

This application is a continuation of and claims the benefit of PCT Patent Application No. PCT/CN2020/137169 filed on Dec. 17, 2020 in the English language in the State Intellectual Property Office and designating the United States, the contents of which are hereby incorporated herein by reference in its entirety.

BACKGROUND

Due, at least in part, to the growth of the Internet and the World Wide Web (commonly known as the Web), more and more content is available to more and more people. This network growth has also led to the development of cloud-based services and platforms, and use of such services and platforms by organizations, such as companies, enterprises, governments, and agencies, to implement digital resource management service solutions. These digital resource management service solutions provide an integrated technology framework designed to deliver and manage applications, data, and desktop delivery. For example, through the digital resource management service, employees are able to access the systems and tools they need from a large variety of devices, both personal and professional.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include, by a computing device of a first user, receiving a notification of an arrival of a message addressed to the first user from a second user and determining that the message is a secure message. The method may also include, by the computing device of the first user, associating a security tag icon to the message, the security tag icon providing an indication that the message is a secure message, and causing a display of the associated security tag icon with a displayed indication of the arrival of the message.

According to another illustrative embodiment provided to illustrate the broader concepts described herein, a system includes a memory and one or more processors in communication with the memory. The processor may be configured to receive a notification of an arrival of a message addressed to a first user from a second user and determine that the message is a secure message. The processor may be further configured to associate a security tag icon to the message, the security tag icon configured to provide an indication that the message is a secure message, and cause a display of the associated security tag icon with a displayed indication of the arrival of the message.

According to another illustrative embodiment provided to illustrate the broader concepts described herein, a method may include, by a computing device, determining that a message addressed to a first user from a second user is a secure message based on a query of a security profile associated with the second user, the security profile specifying whether messages from the second user are one of delete on arrival messages or delete on response messages. The method may also include, by the computing device, associating a security tag icon to the message, the security tag icon providing an indication that the message is a secure message, the security tag icon is one of a delete on arrival tag icon or a delete on response tag icon, and causing a display of the associated security tag icon with a displayed indication of the arrival of the message.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
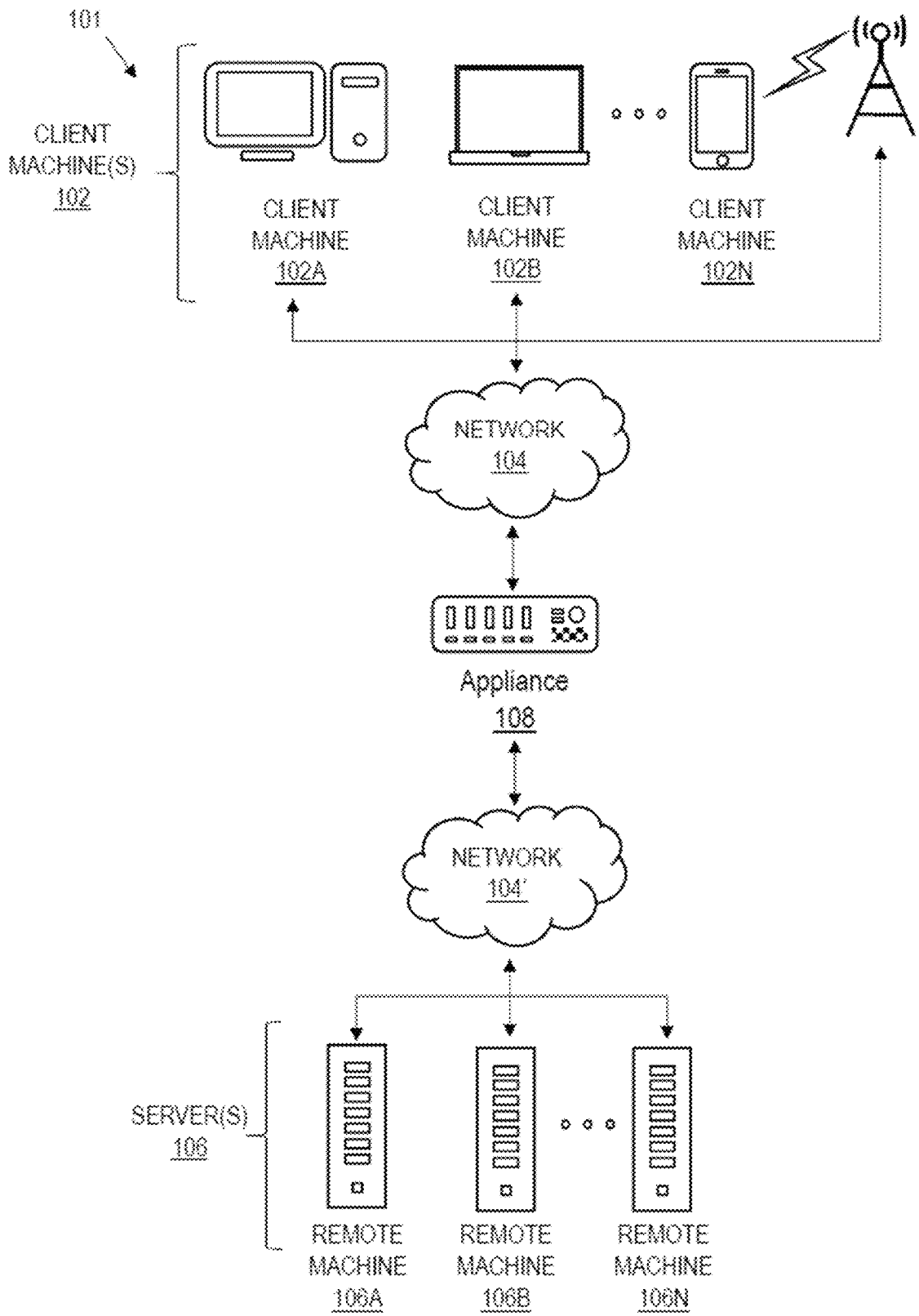
FIG. 1 is a diagram of an illustrative network computing environment in which embodiments of the present disclosure may be implemented.

Digital resource management services (or more simply "resource management services") provide an infrastructure that empowers employees to access systems and tools to work from anywhere. Such resource management services may allow access to collaboration tools, such as SLACK®, Skype®, Microsoft® Teams, and other communication and collaboration applications and services, to enable employees and other users to rapidly share, gather, and process information by messaging. For example, an employee, as one participant in a messaging conversation, can utilize the resource management services to author and upload a message to the collaboration service. The collaboration service then distributes the message to the other participants.

One concern with communicating by messaging is the potential for having one's privacy violated. For example, a messaging participant may be concerned that a message communicated in private to a trusted person may be communicated to one or more persons other than the trusted messaging participant (i.e., information in the message may be made public or "leaked"). Also, when the contents of a message, which may include sensitive content, is displayed, for example on a display device, the displayed message content may be intended to be viewed only by a specific individual or individuals. However, when message content is displayed, there is a risk that such displayed message content may be viewed or otherwise compromised by one or more persons other than the specific individual or individuals. For example, unauthorized persons nearby the display may be able to view the message content being displayed on the display device.

Concepts, devices, systems, and techniques are disclosed for secure collaboration messaging. In some embodiments, secure messaging is achieved in a system having a security component in a first device configured to receive messages from a second device. The security component may be implemented in one or more processors in communication with a memory and configured to receive a notification of an arrival of a message addressed to a first user from a second user. The security component determines whether the message addressed to a first user from a second user is a secure message. In response to a determination that the message is a secure message, the security component associates a security tag icon to the message (i.e., the security component associates to the message an indication that the message is a secure message). Then, when an indication of the arrival of the message is displayed, the security component causes a display of the security tag icon next to or proximate to the displayed indication of the arrival of the message.

As used herein, "secure message" refers to any message to which a recipient of a message (sometimes referred to herein more simply as a "message recipient") assigns a security level as specified by a sender of the message (sometimes referred to herein more simply as a "message sender"). For example, the assignment of the security level to the message may be performed by a security component associated with the message recipient, wherein the assigned security level is specified by the message sender.

Such systems may also enable or otherwise provide for deletion of messages according to a type or level of security (sometimes referred to herein more simply as a "security level") assigned to or otherwise associated with the messages. For example, in response to a determination that a message is to be deleted based on its assigned security level, the security component can send to a collaboration service with which the message is being sent a command to delete the message. In an example implementation, the security component may send the command to delete the secure message using an application programming interface (API) of the collaboration service.

A deleted message is no longer available for viewing by the recipient of the message. For example, in some embodiments, the message is deleted such that a client device used by the recipient of the message to receive and/or view the message no longer contains any trace of ever having received the message. In cases where the message is stored on the client device of the message recipient, the message is deleted from anywhere it can be stored, such as from memory (e.g., memory associated with an inbox). In cases where a collaboration service is used in sending the message, the message is deleted from computing devices (e.g., from memories or other information storage components of devices) used by the collaboration service to process the message. Ideally, the message is deleted such that computing devices used by the collaboration service no longer contain any trace of ever having processed the message. In some examples, no copy of the message is maintained in any archive nor in any backup system. In some examples, no dialog or messaging conversation (sometimes referred to herein more simply as a "conversation") that includes the message is maintained when the message is deleted.

To provide secure collaboration messaging, according to some embodiments disclosed herein, a resource management service provides users the ability to activate or otherwise enable a secure messaging feature and to specify a security level that is to be applied to messages sent by the users while secure messaging is enabled. For example, in some embodiments, a client application may provide a user interface (UI) that is capable of receiving input to enable or disable the secure messaging feature provided by the resource management service.

The resource management service may maintain a record of a user enabling or disabling the secure messaging feature in a security profile associated with the user. The resource management service may also record in the security profile an indication of a security level specified by the user. When secure messaging is enabled, a message sent by the user may be identified by the message recipient (e.g., security component of the message recipient). As such, the message recipient can assign to the message the security level specified by the user (i.e., the message sender). The message identified as being a secure message may be processed in accordance with the assigned security level.

Examples of security levels include a delete on arrival and a delete on response. In brief, the delete on arrival security level when applied to a message requires that the message be deleted once the message is read, for example, by a recipient of the message. The delete on response security level when applied to a message requires that the message be deleted once the message is read and replied or otherwise responded to, for example, by a recipient of the message. In cases where the message is read and not immediately responded to, the message may be deleted after a predetermined period of time (also referred to as a predetermined duration). In an implementation, the user may specify the period of time when specifying the delete on response security level. Different periods of time may be specified for different length messages. Different periods of time may be specified for different types of messages. In some embodiments, the period of time may be based on the relative length or size of the message. In some embodiments, the period of time may be based on historical usage data associated with the recipient of the message. In some embodiments, the delete on arrival security level or the delete on response security level applied to a message requires that the message be deleted after a predetermined amount of time regardless of whether the message is read. Security levels will be further described below at least in conjunction with FIGS. 5-12.

In an example scenario and embodiment, a first user can use a resource access application executing (or running) on a client device to connect to the resource management service and enable the secure messaging feature (e.g., via a client application UI). When enabling the secure messaging feature, the first user may specify the delete on response security level. The first user can then send a message, for example, as a message sender or originator, to a second user (i.e., a message recipient). When the message for the second user arrives at a collaboration service that is being utilized to send the message, the collaboration service may provide to a resource access application of the second user a notification of the arrival of the message at the collaboration service. Upon the resource access application of the second user being notified of the arrival of the message at the collaboration service, the resource access application of the second user may query (or check with) the resource management service to determine whether the first user has enabled the secure messaging feature (i.e., whether secure messaging is enabled for the first user). If it is determined that secure messaging is enabled for the first user, the resource access application of the second user can identify the message as being a secure message. If the message is identified as being a secure message, the resource access application of the second user may also query the resource management service to determine the security level specified by the first user. In the example above, the resource access application of the second user can identify the message as being a secure message having a delete on response security level. The resource access application of the second user can attach or otherwise associate a security tag icon to the identified message. When an indication of the arrival of the identified message is displayed on the client device of the second user, the resource access application of the second user can display the associated security tag icon with the displayed indication of the arrival of the identified message. The displayed security tag icon may serve as a visual indication to a user that the message has been identified as being a secure message. The security tag icon may also serve to indicate the security level assigned to the message. Continuing the example above, the resource access application of the second user may associate a "delete on arrival" tag icon to the message and display the delete on arrival tag icon along with the displayed indication of the arrival of the message on the client device of the second user. The delete on arrival tag icon indicates that the message has been identified as being a secure message that is to be deleted once the message is read. The resource access application of the second user can then perform monitoring to detect the reading of the secure message. Upon detecting the reading of the secure message, the resource access application of the second user can cause the deletion of the message identified as being a secure message. For example, the resource access application of the second user can send to the collaboration service a command to delete the message. Note that, in cases where the delete on response security level is specified as a security level for a message, a "delete on response" tag icon may be associated to the message to indicate that the message has been identified as being a secure message that is to be deleted once the message is read and responded to.

Although certain embodiments and/or examples are described herein in the context of a resource management services implementation, it will be appreciated in light of this disclosure that such embodiments and/or examples are not limited or restricted in application to the details of implementation in conjunction with the resource management services. Rather, the concepts, devices, systems, and techniques are capable of implementation in other examples and of being practiced or of being carried out in various ways. Further, examples of specific implementations are provided herein for illustrative purposes only and are not intended to be limiting. The acts components, elements, and features discussed in conjunction with any one or more examples are not intended to be excluded from a similar role in any other examples. By way of only one example, the concepts and techniques described herein may be implemented by a collaboration system or service independent of a resource management services or system. Numerous other advantages, variations, and embodiments will be apparent in light of this disclosure.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
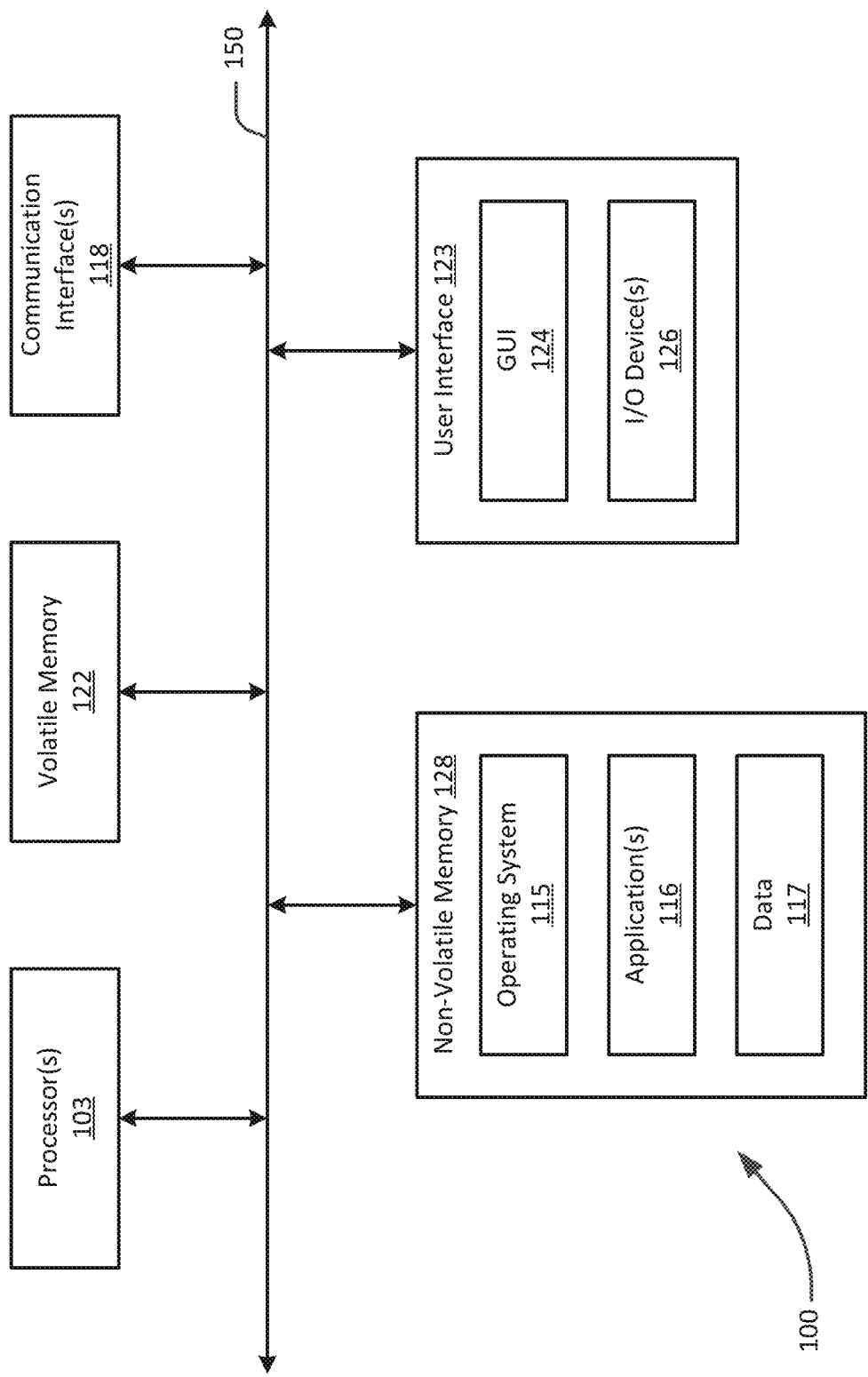
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
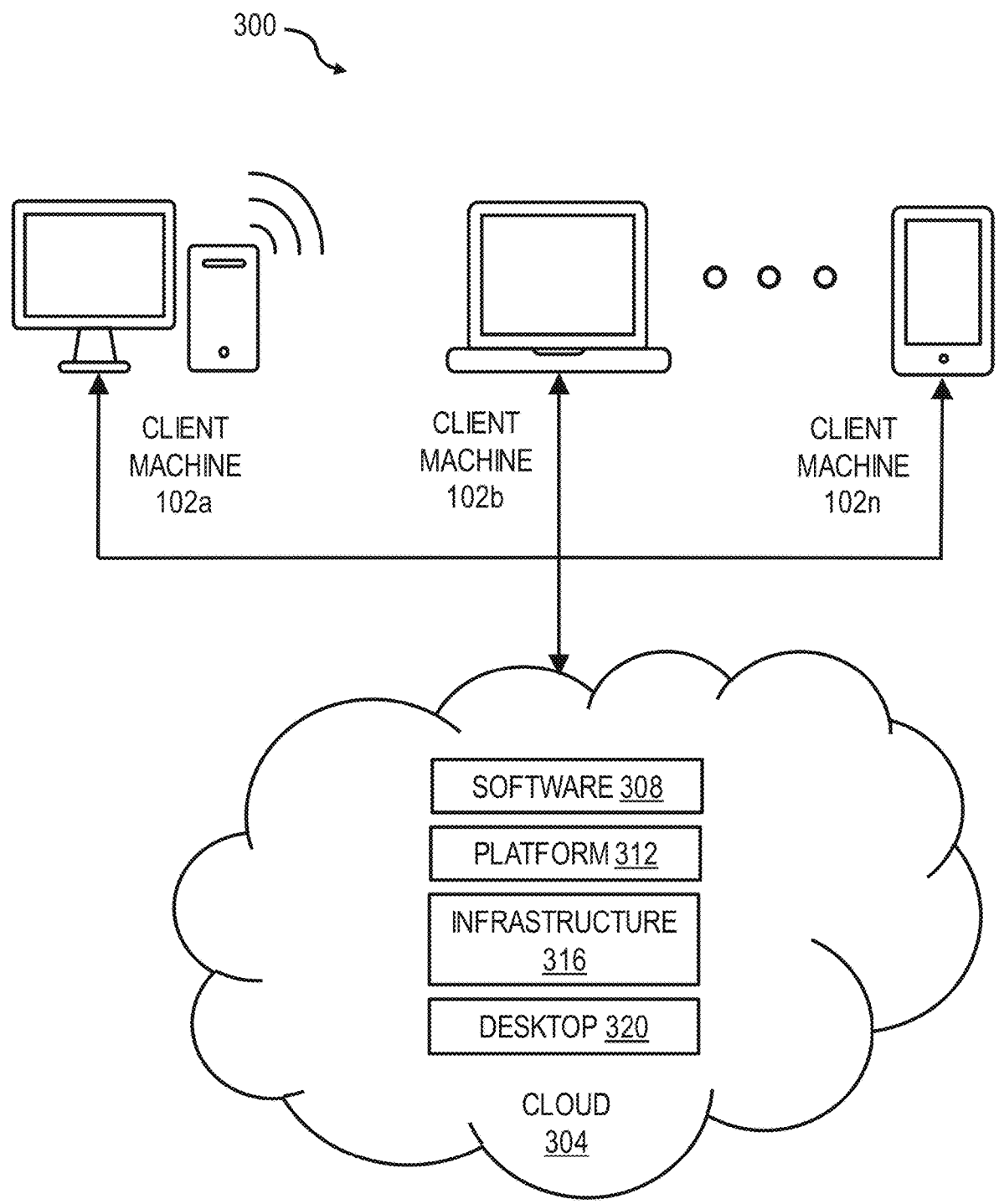
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
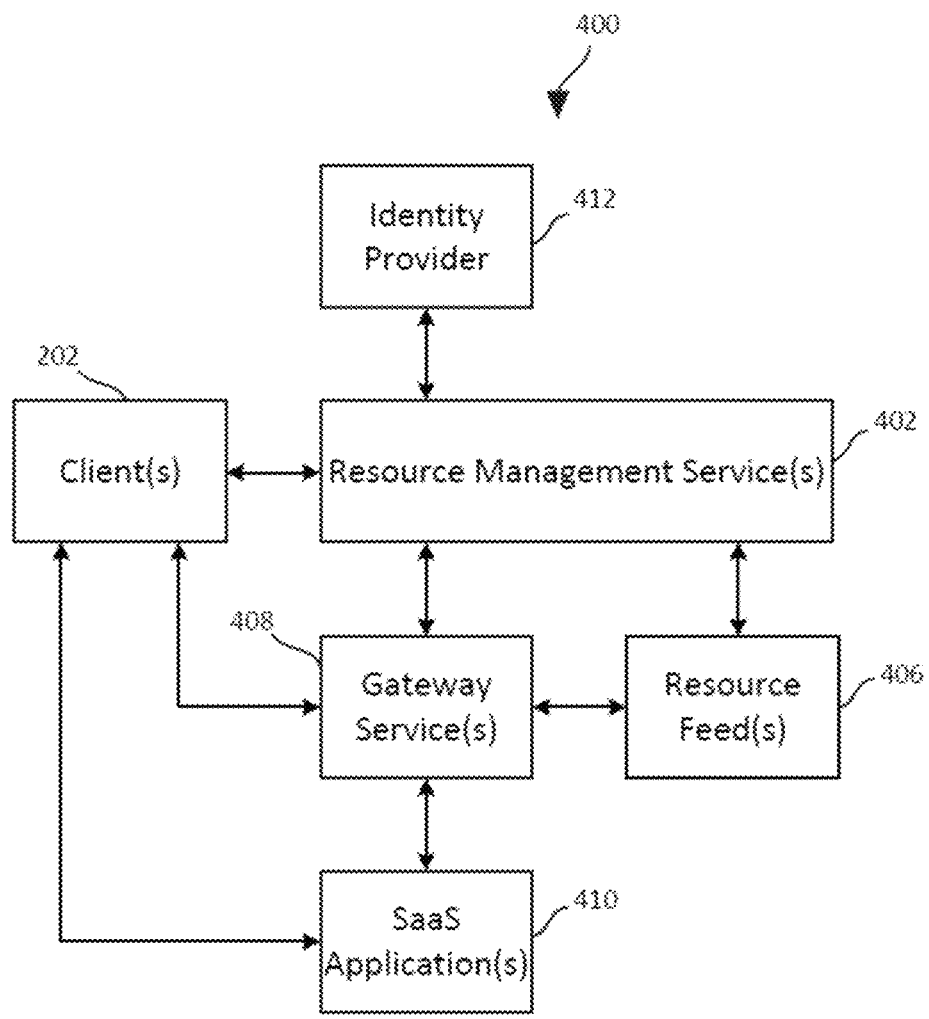
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
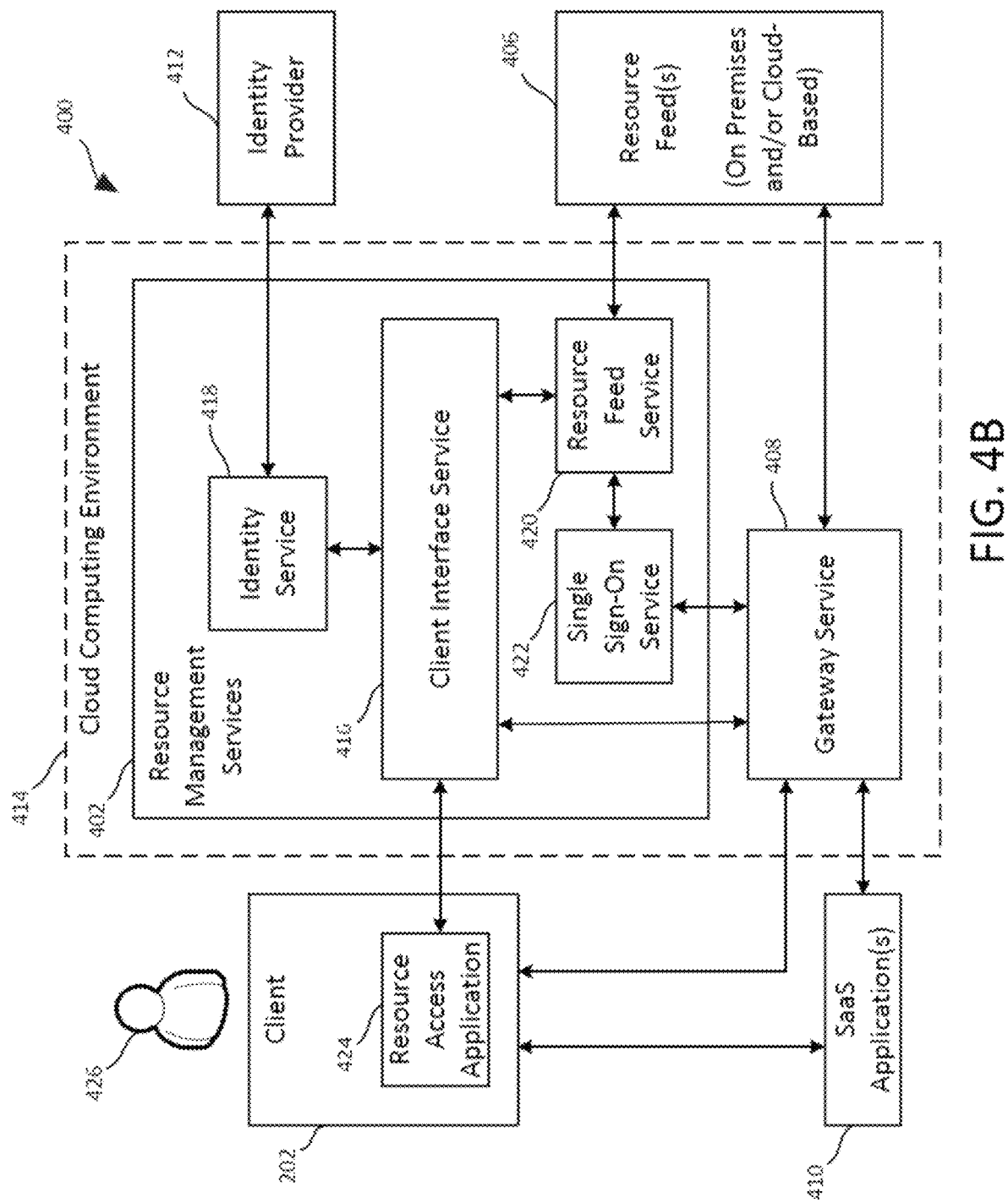
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
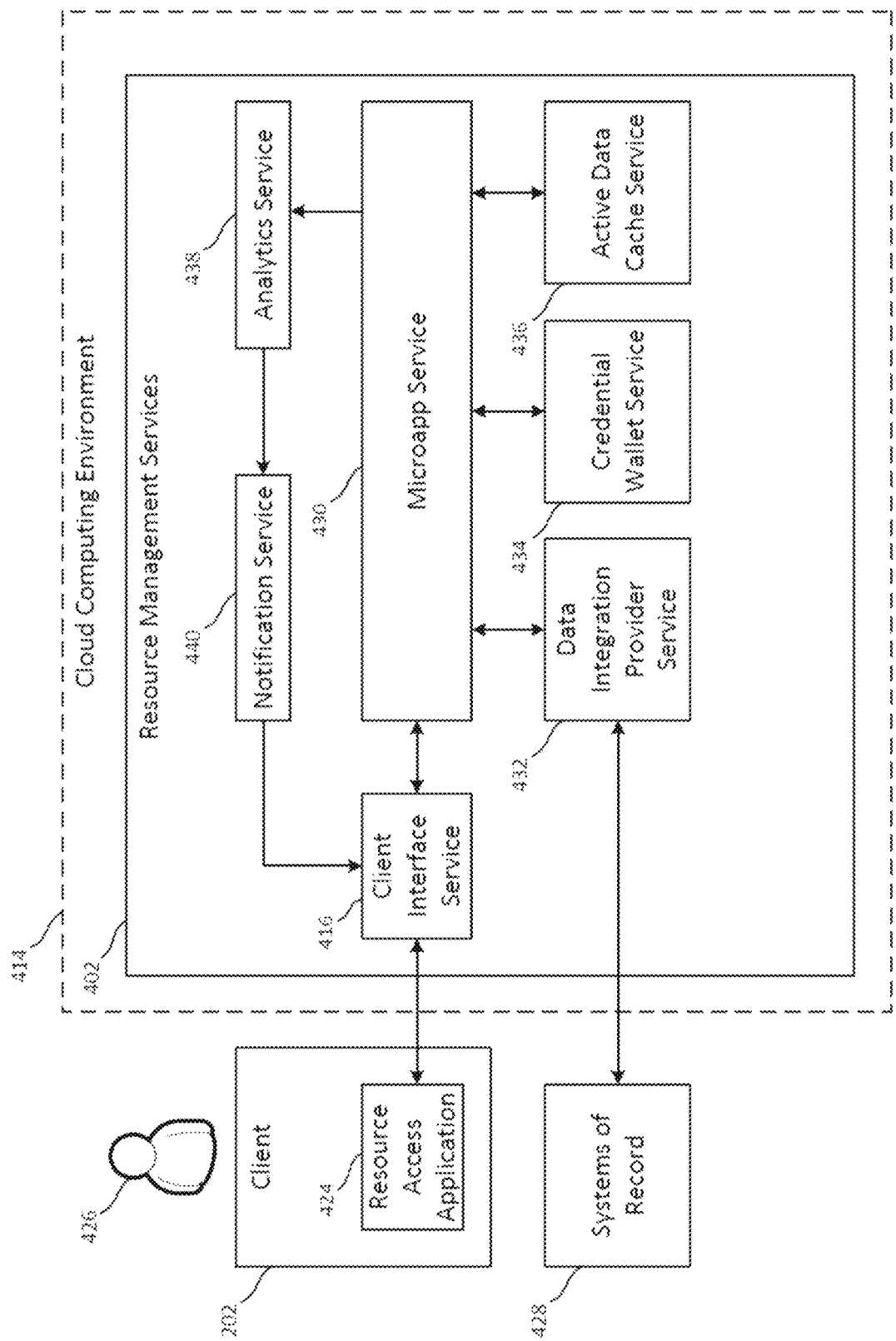
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
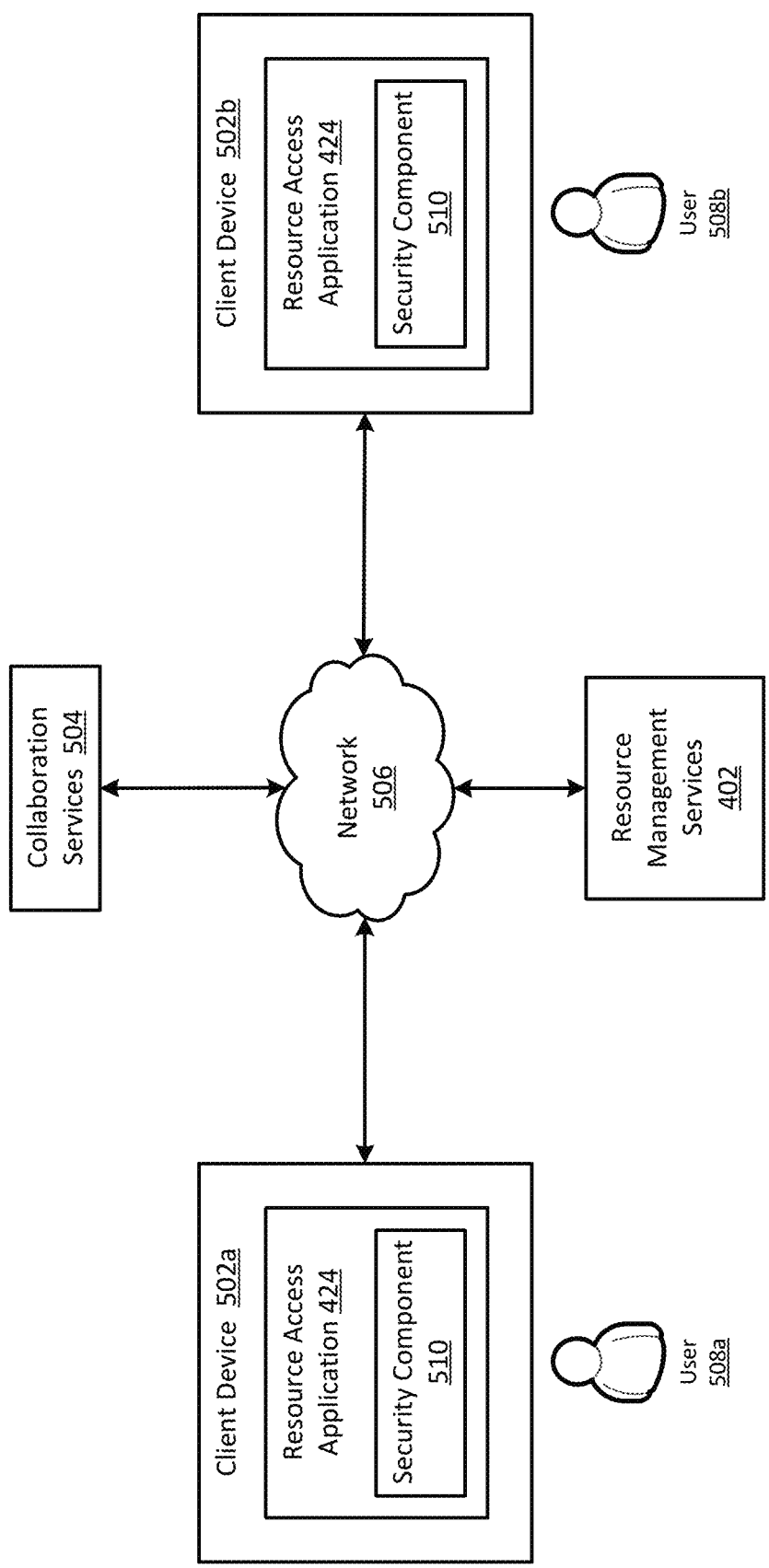
FIG. 5 is a block diagram of an example network environment in which secure collaboration messaging may be implemented, in accordance with an embodiment of the present disclosure.

FIG. 5 is a block diagram of an example network environment 500 in which secure collaboration messaging may be implemented, in accordance with an embodiment of the present disclosure. As shown, network environment 500 can include a processing device (e.g., a server or other processing device) coupled to network 506 which functions to provide resource management services 402, client devices 502a, 502b (individually referred to herein as client device 502 or collectively referred to herein as client devices 502), and a processing device (e.g., a server or other processing device) coupled to network 506 which functions to provide collaboration services 504. Details and examples of various collaboration services will be described hereinbelow. Resource management services 402 and collaboration services 504 may be provided as part of a cloud computing environment (e.g., cloud computing environment 414 in FIG. 4B).

Network 506 may correspond to one or more to wireless or wired computer networks including, but not limited to, local-area networks (LANs), metropolitan area networks (MANs), wide area networks (WANs), wireless local-area networks (WLAN), primary public networks, primary private networks, Wi-Fi (i.e., 802.11) networks, Bluetooth networks, and Near Field Communication (NFC) networks. In certain embodiments, at least a portion of the functionality associated with network 506 may be provided by a cellular data network, thereby making it easier for users of mobile computing devices to leverage the functionality/services of applications that may be executing on such mobile computing devices. In general, communications amongst the various entities and resources described herein may occur via wired or wireless connections, such as may be provided by Wi-Fi or mobile data networks.

Network environment 500 may provide services for one or more organizations, with the organizations having one or more users associated with it. A given client device 502 may be assigned to or otherwise associated with a particular user. For example, as shown in FIG. 5, client device 502a may be assigned to, or associated with, a user 508a, and client device 502b may be assigned to, or associated with, a user 508b. While only two client devices 502 and two corresponding users 508a, 508b (individually referred to herein as user 508 or collectively referred to herein as users 508) are shown in FIG. 5, the structures and techniques sought to be protected herein can be applied to any number of organizations, users, and devices.

Client devices 502 can include smartphones, tablet computers, laptop computers, desktop computers, or other computing devices configured to run user applications (or "apps"). In some embodiments, a client device 502 may be substantially similar to client machine 102 described above in the context of FIGS. 1 and 3, computing device 100 described above in the context of FIG. 2, and/or client 202 described above in the context of FIGS. 4A-4C.

Collaboration services 504 may provide collaboration and communication functionality to allow users to participate in an interactive collaboration session from various locations. Users can use computing devices (e.g., client devices 502) to join and participate in the collaboration session during which documents can be shared and edited, whiteboard sessions can be conducted, tasks can be assigned and tracked, and voice, text chat (e.g., collaboration messaging), instant messaging, and video communications can be conducted, among other features. Collaboration services 504 may also enable users to view past videos and text chats. In one example implementation, collaboration services 504 may be provided by a web server that serves user requests, one or more collaboration applications that provide the respective main application engines for the various services provided by collaboration services 504, and one or more databases that support the application engines. In some embodiments, collaboration services 504 may be a service provided by resource management services 402. In other embodiments, some or all of the services provided by collaboration services 504 may be a third-party service(s), for example, provided via resource feed(s) 406 and/or SaaS applications(s) 410 described above in the context of FIGS. 4A and 4B.

With continued reference to, and as shown in FIG. 5, user 508a may access resource management services 402 and other services (e.g., collaboration services 504) and network resources using resource access application 424 installed on client 502a. Similarly, user 508b may access resource management services 402 and other services (e.g., collaboration services 504) and network resources using resource access application 424 installed on client 502b. As described previously, resource access application 424 and associated components may provide user 508 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing web-based SaaS applications along with other types of web apps and websites. In some cases, resource access application 424 may be a native web browser application and not the CITRIX WORKSPACE app. In such cases, resource access application 424 may communicate with CITRIX WORKSPACE app via web plugins and/or extensions. In other cases, the CITRIX WORKSPACE app may itself be a web browser.

As a solution to the aforementioned and other technical problems, in some embodiments, resource access application 424 may be programmed or otherwise configured to provide a user interface (UI) that is capable of receiving input to enable or disable a secure messaging feature provided by resource management services 402. In one example implementation, resource access application 424 can provide a UI element, such as an input dialog box or a check box, that allows a user (e.g., user 508) to enable or disable the secure messaging feature. In response to a user input to enable the secure messaging feature, such as a selection of a check box, resource access application 424 can provide an interface that allows the user to specify a security level to apply to messages sent by the user while secure messaging is enabled. In brief, messages sent when secure messaging is enabled are assigned the specified security level and processed in accordance with the assigned security level.

For example, in an embodiment, the security levels may include delete on arrival and/or delete on response. The delete on arrival security level when applied to a message requires that the message be deleted once the message is read. For example, a message that is assigned the delete on arrival security level is deleted upon the message being read by a recipient of the message. The delete on response security level when applied to a message requires that the message be deleted once the message is read and replied or otherwise responded to. For example, a message that is assigned the delete on response security level is deleted upon the message being responded to by a recipient of the message.

In some embodiments, a message that is deleted is no longer available for viewing by the recipient of the message. For example, the message is deleted such that a client device (e.g., client 502) used by the recipient of the message to receive and/or view the message no longer contains any trace of ever having received the message. In cases where the message is stored on the client device of the message recipient, the message is deleted from anywhere it can be stored, such as from memory (e.g., memory associated with an inbox). In cases where a collaboration service (e.g. collaboration services 504) is used in sending the message, the message is deleted from computing devices (e.g., from memories or other information storage components of devices) used by the collaboration service to process the message. Ideally, the message is deleted such that computing devices used by the collaboration service no longer contain any trace of ever having processed the message. In some examples, no copy of the message is maintained in any archive nor in any backup system. In some examples, no dialog or messaging conversation (sometimes referred to herein more simply as a "conversation") that includes the message is maintained when the message is deleted.

As can be seen in FIG. 5, resource access application 424 can include a security component 510. For instance, in an implementation, security component 510 may be implemented as a plugin (i.e., software code or a software component that enables an existing application or program to perform a function it could not otherwise perform; stated differently, the plugin adds a specific feature or functionality to an existing application or program) on resource access application 424. In some embodiments, security component 510 is configured to manage implementation of the secure messaging feature, including processing of messages according to respective security levels assigned to the messages. To this end, security component 510 is configured to record the enabling and disabling of the secure messaging feature by a user (e.g., user 508) of resource management services 402. In an implementation, security component 510 may utilize resource management services 402 to record the enabling and disabling of the secure messaging feature. For example, upon a user enabling or disabling the secure messaging feature, security component 510 can send to resource management services 402 an indication of the enabling or disabling of the secure messaging feature by the user. In the case where the user enables the secure messaging feature, security component 510 is also configured to obtain or otherwise determine a security level specified by the user and send to resources management services 402 an indication of the security level specified by the user. Sending such indications allows resource management services 402 to maintain a record of the user enabling or disabling the secure messaging feature as well as any specified security level. In one example implementation, resource management services 402 may record the indication of the enabling or disabling of the secure messaging feature and the specified security level in a security profile associated with the user.

In some embodiments, security component 510 is configured to provide an indication of a state (e.g., enabled or disabled) of the secure messaging feature. In an implementation, security component 510 may display an element, such as an icon, on a UI of collaboration services 504 (e.g., collaboration services 510 client window) rendered on client device 502. The displayed element (e.g., icon) provides a visual indication to the user that the secure messaging feature is enabled. In some such implementations, the displayed element may be an actionable icon (e.g., a button) that can be clicked or otherwise activated to enable or disable the secure messaging feature. For example, the icon may display in a first color (e.g., red) when the secure messaging feature is enabled, and the icon may display in a second color (e.g., gray) when the secure messaging feature is disabled.

In some embodiments, security component 510 is configured to determine which messages sent via collaboration services 504 are to be identified as secure messages and assign an appropriate security level to individual such identified messages. In one example implementation, upon notification of an arrival of a message for a message recipient (e.g., user 508b), security component 510 of the message recipient may query (i.e., check with) resource management services 402 to determine whether the message sender (i.e., the sender of the message for the message recipient) has enabled the secure messaging feature. In other words, security component 510 of the message recipient can query resource management services 402 to determine whether the message is a secure message. In some such implementations, collaboration services 504 may send or otherwise provide to security component 510 of the message recipient the notification of the arrival of the message for the message recipient at collaboration services 504. The notification may include information such as, for example, the name or ID of collaboration services 504, the name of the sender of the message (which can be used to determine the security level), and the ID of the message (which can be used to identify the specific message). From such identifying information associated with the message, collaboration services 504 can query resource management services 402 to determine the appropriate resource access application 424 and, in particular, security component 510 that is to be notified of the arrival of the message.

Upon a determination that the message sender has enabled secure messaging, security component 510 of the message recipient may further query resource management services 402 to determine the security level specified by the message sender. Security component 510 of the message recipient can then mark or otherwise identify the message as being a secure message and associate a security tag icon to the message. For example, security component 510 of the message recipient may display or cause to be displayed the security tag icon. For example, the security tag icon may be a "delete on arrival" tag icon or a "delete on response" tag icon. Then, when an indication of the arrival of the message is displayed (for example, on the UI of collaboration services 504), security component 510 of the message recipient can display or cause to be displayed the associated security tag icon with the displayed indication of the arrival of the message. Note that determining which messages should be identified as being secure messages and assigning an appropriate security level to individual such identified messages upon notification from collaboration services 504 of the arrival of the messages as disclosed herein allows for implementations of the secure messaging feature in resource management services 402 without any changes or modifications to collaboration services 504, such as, SLACK®, Skype®, and Microsoft® Teams, for example.

In some embodiments, security component 510 is configured to process messages in accordance with the security levels assigned to the messages. More specifically, security component 510 can monitor and detect the reading of a message identified as being a secure message and, upon detecting the reading of the message, process the message in accordance to the assigned security level. In one example implementation, security component 510 can generate and utilize event listeners to listen for events that are indicative of the reading of the message. By way of an example, if an indication of the arrival of a message is provided using a link or icon that can be clicked to view the message, security component 510 can generate an event listener to listen for the clicking of the link or icon since the clicking of the link or icon is indicative of the reading of the message. Additionally or alternatively, security component 510 can query collaboration services 504 to determine whether a message has been read. In some such implementations, security component 510 may continually query collaboration services 504 until a determination is made that the message has been read. Additionally or alternatively, security component 510 can monitor user behavior for actions that are indicative of the reading of a message. Nonlimiting examples of such user behavior include the user navigating away from the UI of collaboration services 504, and, in the case where the client device includes a webcam, a duration of the user's gaze at (e.g., viewing) the screen of the client device. Upon determining that a message identified as being a secure message has been read, security component 510 can process the message in accordance to the assigned security level.

In the case where the security level assigned to a message is delete on arrival, security component 510 can cause the deletion of the message. In an implementation, security component 510 can send to collaboration services 504 a command to delete the message. For example, security component 510 can send the command to delete the message using an application programming interface (API) of collaboration services 504.

In the case where the security level assigned to a message is delete on response, security component 510 can further monitor and detect the sending of a response or a reply to the message. For example, security component 510 can query collaboration services 504 to determine whether the message has been responded to. As another example, security component 510 may determine that the message has been responded to upon detecting the arrival of a subsequent (i.e., later) message in a conversation thread that includes the message. Upon determining that the message is responded to, security component 510 can send to collaboration services 504 a command to delete the message. As explained above, security component 510 can send the command to delete the message using an application programming interface (API) of collaboration services 504.

In some embodiments, security component 510 is configured to delete a message having a delete on response security level after a predetermined period of time once the message is read. In an implementation, the predetermined period of time may be specified by the sender of the message. For example, the sender of the message may specify the predetermined period of time when enabling the secure messaging feature and specifying the delete on response security level. In some such implementations, different periods of time may be specified for different length messages. For example, the sender of the message may specify a first period of time for messages that are smaller than a first size, and a second period of time for messages that are equal to or larger than the first size. In some implementations, different periods of time may be specified for different types of messages. For example, the sender of the message may specify a first period of time for text messages, and a second period of time for messages that include images, and a third period of time for messages that include videos.

In some embodiments, security component 510 is configured to determine the period of time based on the relative length or size of the message. For example, security component 510 can determine a shorter period of time (e.g., 2 minutes, 3 minutes, etc.) for secure messages that are smaller than a threshold size and a longer period of time (e.g., 10 minutes, 11 minutes, etc.) for messages that are equal to or larger than the threshold size.

In some embodiments, security component 510 is configured to determine the period of time based on historical usage data associated with the recipient of the secure message. In such embodiments, security component 510 may obtain the historical usage data from resource management services 402. For example, if the historical usage data indicates that the message recipient responds to messages quickly (or without significant delay), security component 510 can determine a shorter period of time. Conversely, if the historical usage data indicates that the message recipient does not quickly respond to messages (or responds with some delay), security component 510 can determine a longer period of time.

Figure 6:
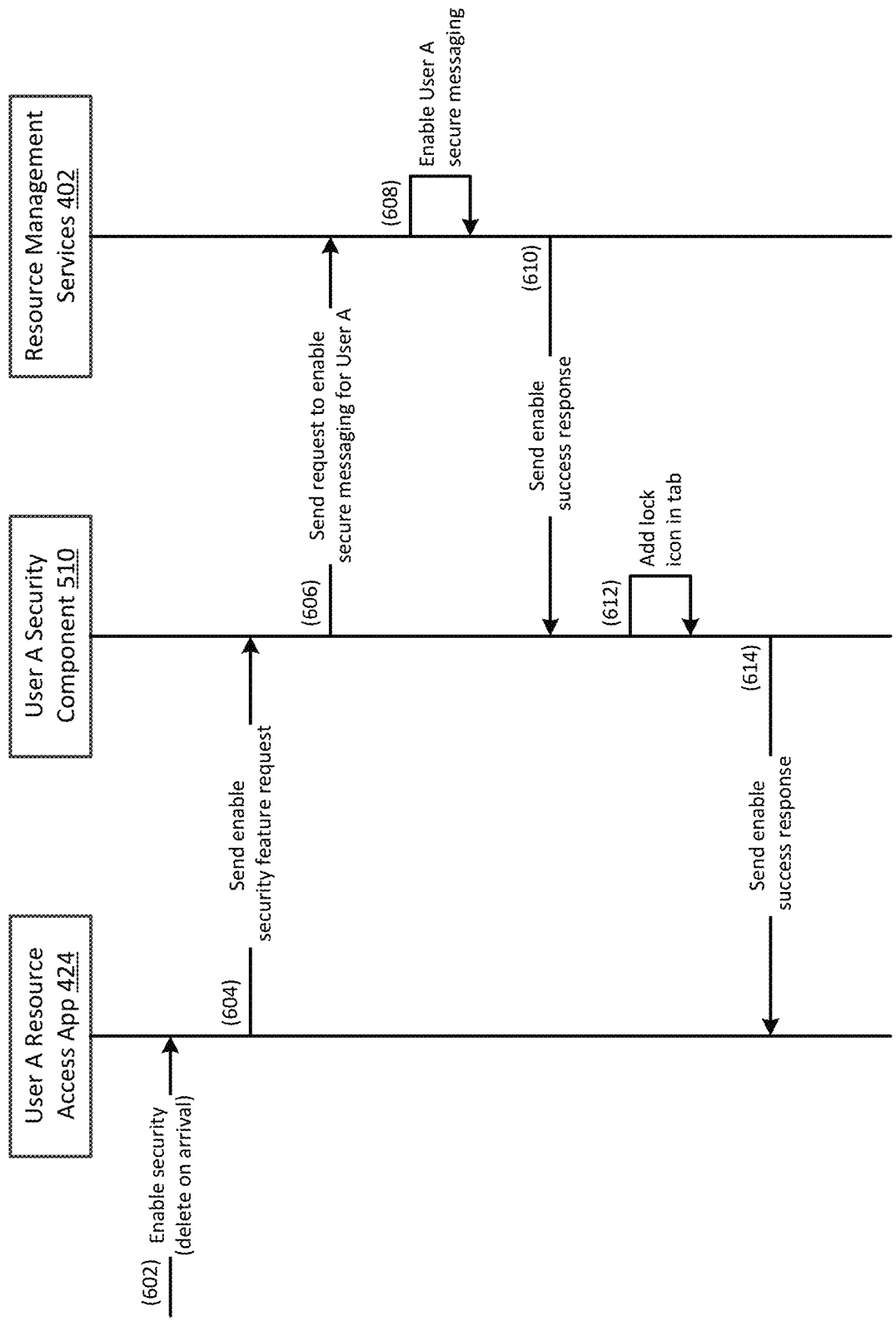
FIG. 6 is a diagram showing an example flow of interactions between various components to enable a secure messaging feature, in accordance with an embodiment of the present disclosure.

FIG. 6 is a diagram showing an example flow of interactions between various components to enable a secure messaging feature, in accordance with an embodiment of the present disclosure. For example, a user A (e.g., user 508a) may use an instance of resource access application 424 running on client device 502 to access resources provided by resource management services 402, including collaboration services 504, to participate in a collaboration session. In this example, user A may want to enable the secure messaging feature provided by resource management services 402. To do so, user A can provide an input (602) to the UI of resource access application 424 of user A to enable the secure messaging feature and specify a desired security level. In the example embodiment of FIG. 6, user A is shown as specifying delete on arrival as the desired security level. Other security levels may, of course, also be specified. The particular security level to select depends upon the needs of a particular application.

Upon user A providing the input to enable the secure messaging feature, resource access application 424 of user A can send (604) to security component 510 of user A a request to enable secure messaging for user A. Resource access application 424 may also send to security component 510 an indication of the security level (i.e., delete on arrival security level) specified by user A. Security component 510 of user A can then send (606) to resource management services 402 a request to enable secure messaging for user A. The request may include an indication of the delete on arrival security level.

In response to the request to enable secure messaging for user A, resource management services 402 can enable (608) secure messaging for user A. For example, resource management services 402 can record an indication of the enabling of the secure messaging feature and the specified delete on arrival security level in a security profile associated with user A. Upon enabling the requested secure messaging feature, resource management services 402 can send (610) to security component 510 of user A an enable success response to inform security component 510 of the successful enablement of the secure messaging feature for user A.

In response to receiving the response, security component 510 of user A can add (612) an element, such as, for example, a lock icon, on a UI of collaboration services 504 to provide a visual indication of the enablement of the secure messaging feature. Security component 510 of user A can then send (614) to resource access application 424 of user A an enable success response to inform resource access application 424 of the successful enablement of the secure messaging feature for user A.

Figure 7:
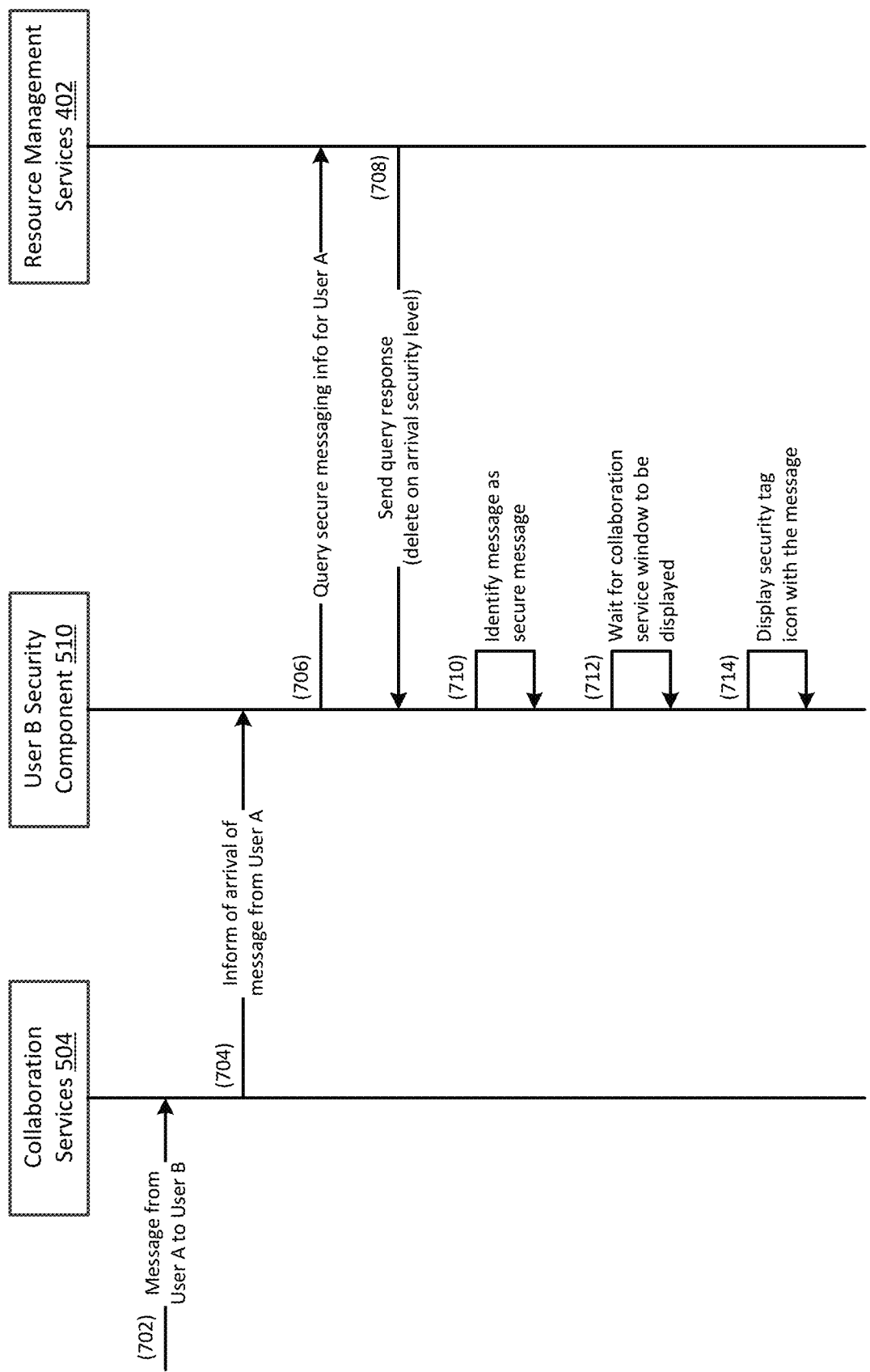
FIG. 7 is a diagram showing an example flow of interactions between various components to associate a security tag icon to a message based on an assigned security level, in accordance with an embodiment of the present disclosure.

FIG. 7 is a diagram showing an example flow of interactions between various components to associate a security tag icon to a message based on an assigned security level, in accordance with an embodiment of the present disclosure. For example, continuing the example of FIG. 6 above, user A may be participating in a collaboration session that includes a user B. While participating in the collaboration session, user A may use the UI of collaboration services 504 to send a message, such as a chat message, to user B. The message sent by user A to user B may arrive (702) at collaboration services 504. Upon arrival of the message for user B, collaboration services 504 may inform (704) security component 510 of user B of the arrival of the message for user B from user A at collaboration services 504. For example, collaboration services 504 may send to security component 510 of user B a notification of the arrival of the message from user A to user B.

Upon being informed of the arrival of the message for user B from user A at collaboration services 504, security component 510 of user B can query (706) resource management services 402 (FIGS. 4 and 5) to determine whether user A has enabled secure messaging. In response to the query, resource management services 402 can send (708) to security component 510 of user B a query response to inform security component 510 of user B that secure messaging is enabled as well as the specified security level (which, in this example, is a delete on arrival security level).

In response to receiving the query response, security component 510 of user B can identify (710) the message from user A to user B as being a secure message. Security component 510 of user B can also associate a delete on arrival tag icon to the message. Security component 510 of user B can then wait (712) for the UI of collaboration services 504 to be displayed. When the UI of collaboration services 504 is displayed that shows an indication of the arrival of the message, security component 510 of user B can display (714) the associated delete on arrival tag icon next to or proximate to the displayed indication of the arrival of the message from user A to user B in the UI of collaboration services 504. The displayed delete on arrival tag icon visually indicates that the message from user A to user B is a secure message that will be deleted once the message is read.

Figure 8:
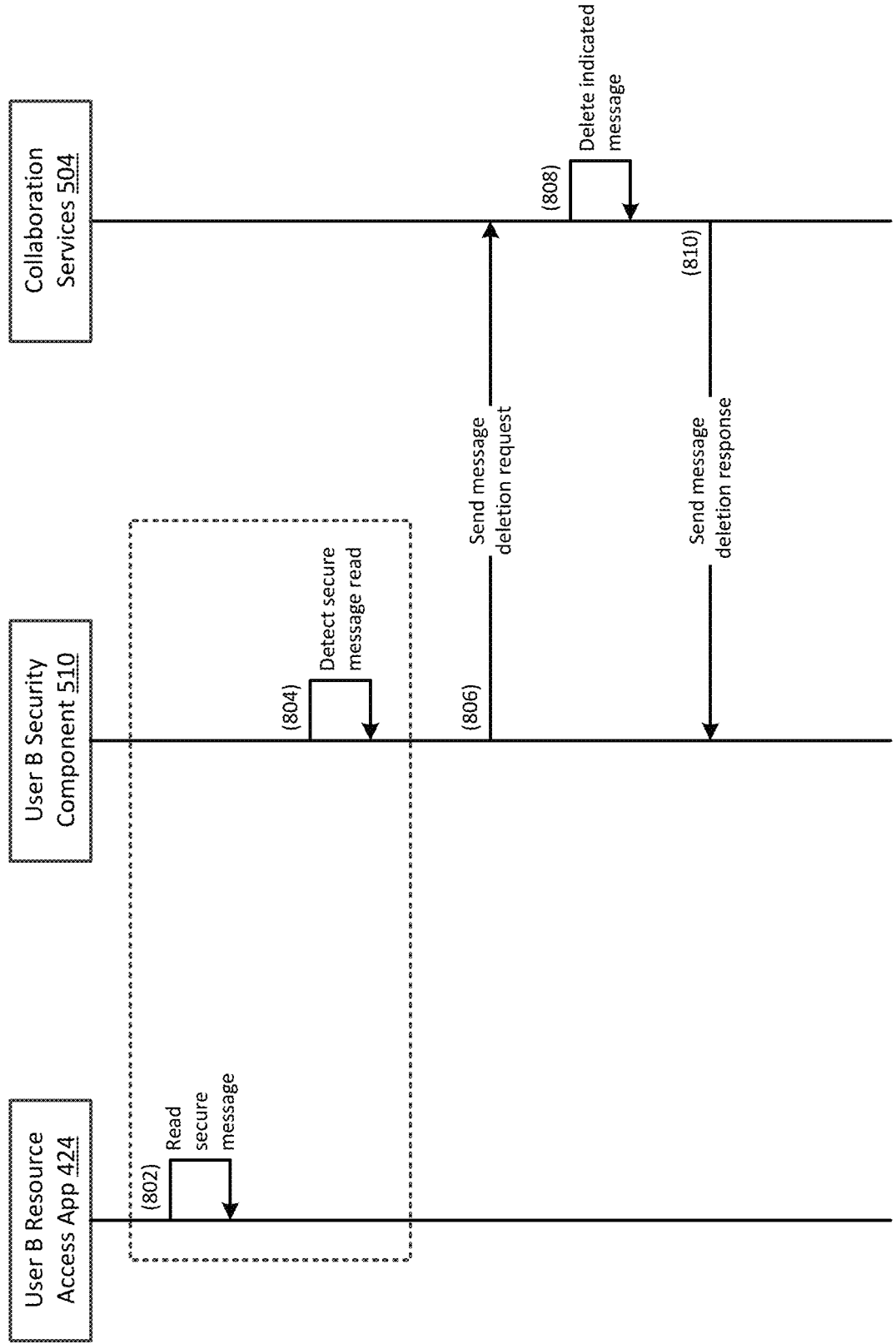
FIG. 8 is a diagram showing an example flow of interactions between various components to delete a message based on an assigned security level, in accordance with an embodiment of the present disclosure.

FIG. 8 is a diagram showing an example flow of interactions between various components to delete a message based on an assigned security level, in accordance with an embodiment of the present disclosure. For example, continuing the example of FIG. 7 above, user A may send a message to user B that has been identified as being a secure message, and an indication of the arrival of the message from user A may be provided to user B on the UI of collaboration services 504. User B can then use resource access application 424 (FIGS. 4B, 4C, and 5) to read (802) the message from user A. Security component 510 of user B can detect (804) that the message has been read. For example, security component 510 of user B can generate and utilize event listeners to listen for events that are indicative of the reading of the message.

Upon detecting the reading of the message from user A, security component 510 of user B can send (806) to collaboration services 504 a command to delete the message from user A to user B. For example, security component 510 of user B can send the command requesting deletion of the message using an API of collaboration services 504. In response to receiving the command, collaboration services 504 can delete (808) the indicated message from user A to user B. Collaboration services 504 can then send (810) to security component 510 of user B a message deletion response to inform security component 510 of user B that the message from user A to user B has been successfully deleted.

Figure 9:
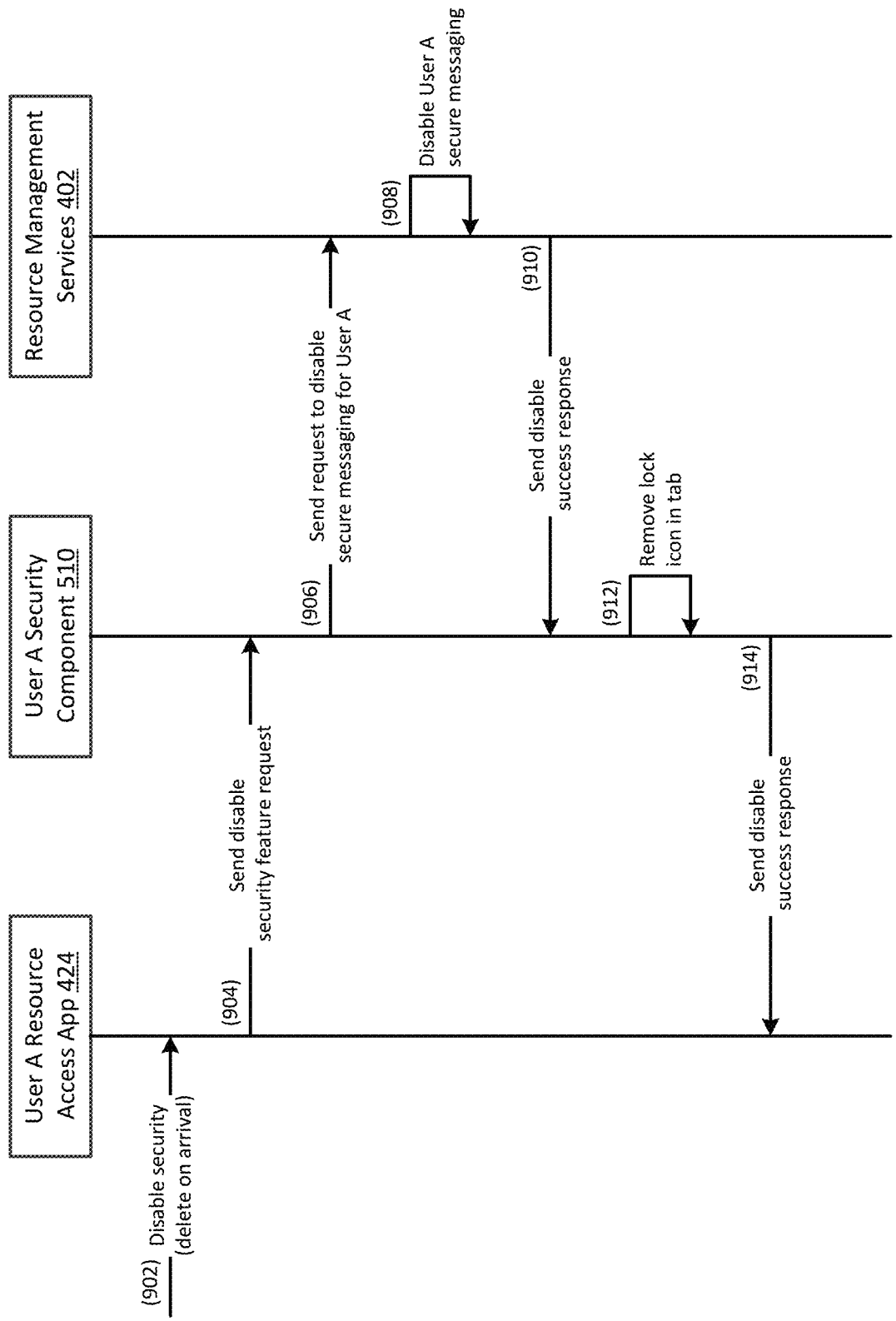
FIG. 9 is a diagram showing an example flow of interactions between various components to disable a secure messaging feature, in accordance with an embodiment of the present disclosure.

FIG. 9 is a diagram showing an example flow of interactions between various components to disable a secure messaging feature, in accordance with an embodiment of the present disclosure. For example, continuing the example of FIG. 6 above, user A may want to disable a previously enabled secure messaging feature provided by resource management services 402. To do so, user A can provide an input (902) to the UI of resource access application 424 of user A to disable the secure messaging feature.

Upon user A providing the input to disable the secure messaging feature, resource access application 424 of user A can send (904) to security component 510 of user A a request to disable secure messaging for user A. Upon receiving the request to disable secure messaging for user A, security component 510 of user A can send (906) to resource management services 402 a request to disable secure messaging for user A.

In response to the request to disable secure messaging for user A, resource management services 402 can disable (908) secure messaging for user A. For example, resource management services 402 can record an indication of the disabling of the secure messaging feature in the security profile associated with user A. Upon disabling the secure messaging feature, resource management services 402 can send (910) to security component 510 of user A a disable success response to inform security component 510 of the successful disabling of the secure messaging feature for user A.

In response to receiving the response, security component 510 of user A can remove (912) the element (e.g., the lock icon) previously added on the UI of collaboration services 504. As explained above, the removed element was previously added to provide a visual indication of the enablement of the secure messaging feature. This element is now removed since the secure messaging feature for user A is disabled. Security component 510 of user A can then send (914) to resource access application 424 of user A a disable success response to inform resource access application 424 of the successful disabling of the secure messaging feature for user A.

Figure 10:
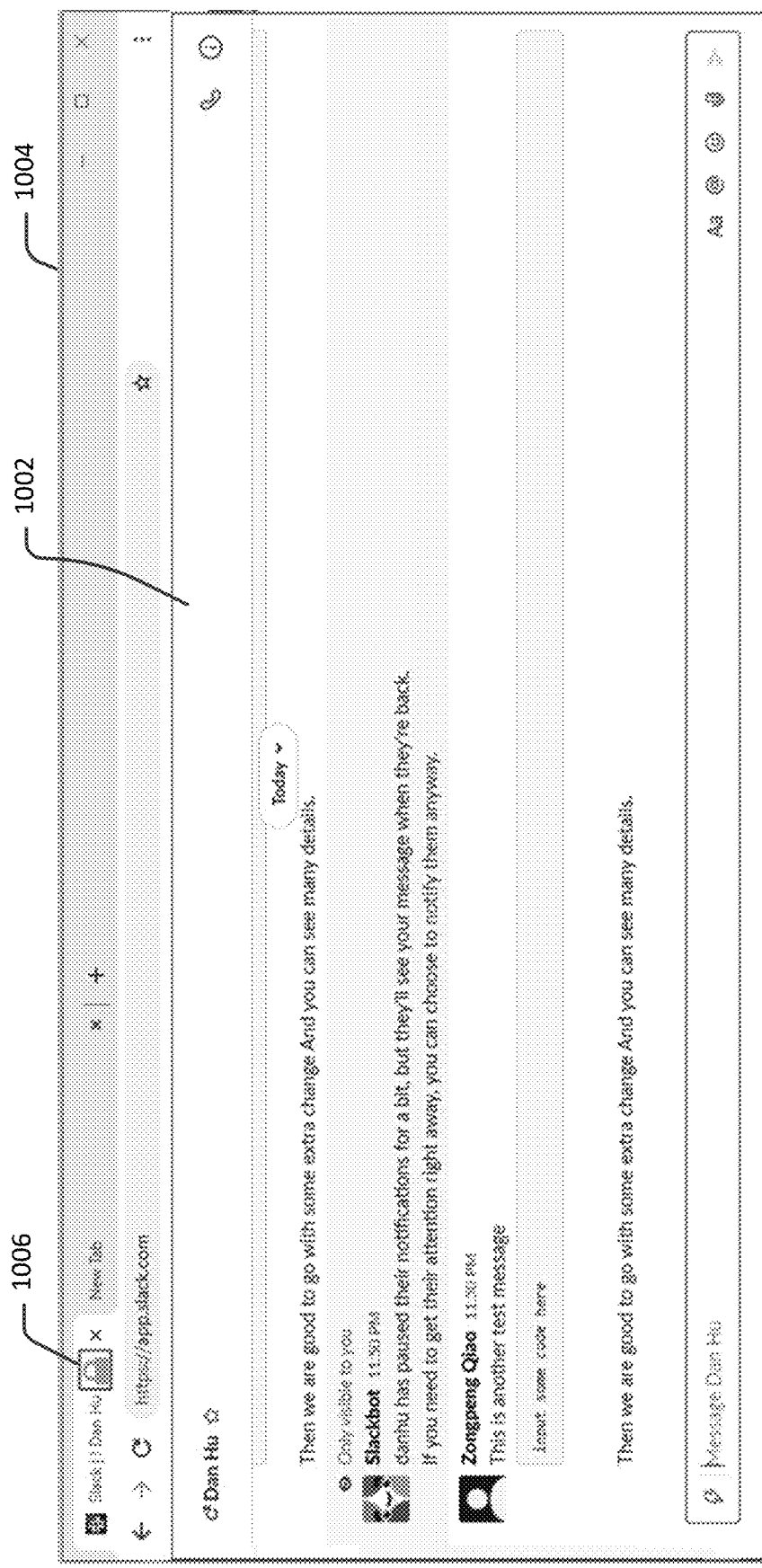
FIG. 10 is a screenshot illustrating an example collaboration services user interface (UI) showing a lock icon to indicate that secure messaging is enabled, in accordance with an embodiment of the present disclosure.

FIG. 10 is a screenshot illustrating an example collaboration services user interface (UI) showing a lock icon to indicate that secure messaging is enabled, in accordance with an embodiment of the present disclosure. The collaboration services UI (see reference numeral 1002) may be displayed within resource access application 424 UI (see reference numeral 1004) on client device 502 of user 508 (e.g., Dan Hu as shown in FIG. 10). The collaboration services UI (see reference numeral 1002) may include a lock icon (see reference numeral 1006) displayed in a tab control element of the collaboration services UI. The lock icon (see reference numeral 1006) may be displayed as a visual indication that secure messaging is enabled for user 508. In some implementations, the lock icon (see reference numeral 1006) may be a link that can be clicked to access a UI element, such as a dialogue, that is capable of receiving input to enable or disable the secure messaging feature.

Figure 11:
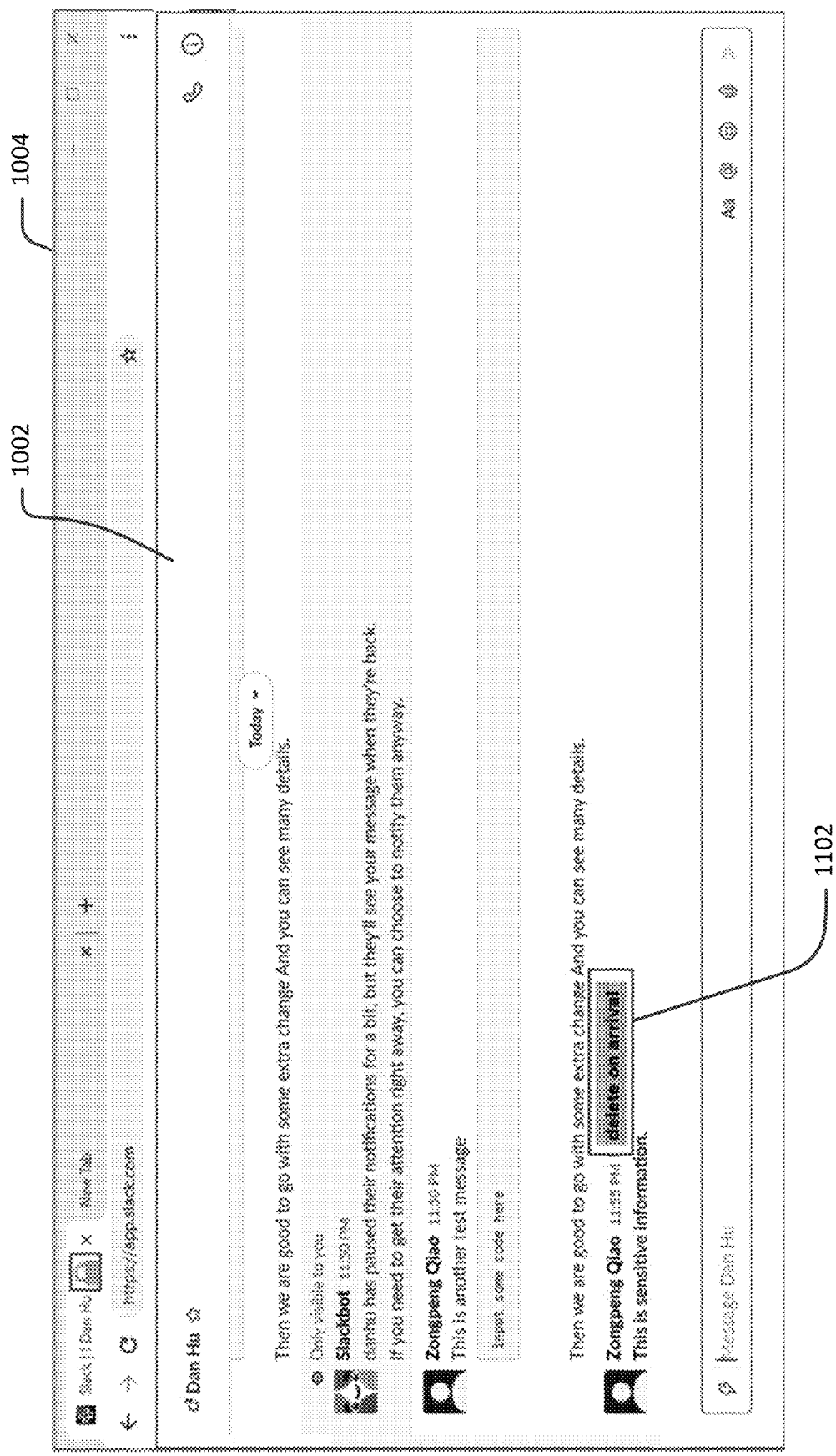
FIG. 11 is a screenshot illustrating an example collaboration services user interface (UI) showing a delete on arrival tag icon with an indication of a message, in accordance with an embodiment of the present disclosure.

FIG. 11 is a screenshot illustrating an example collaboration services user interface (UI) showing a delete on arrival tag icon with an indication of a message, in accordance with an embodiment of the present disclosure. The collaboration services UI (see reference numeral 1002) may be displayed within resource access application 424 UI (see reference numeral 1004) on client device 502 of user 508 (e.g., Dan Hu as shown in FIG. 11). The collaboration services UI (see reference numeral 1002) may include a delete on arrival tag icon (see reference numeral 1102) displayed next to an indication informing of an arrival of a message from Zongpeng Qiao sent at 11:55 PM. The delete on arrival tag icon (see reference numeral 1102) may be displayed next to the indication of the message from Zongpeng Qiao sent at 11:55 PM as an indication that this message is a secure message that will be deleted once the message is read.

Figure 12:
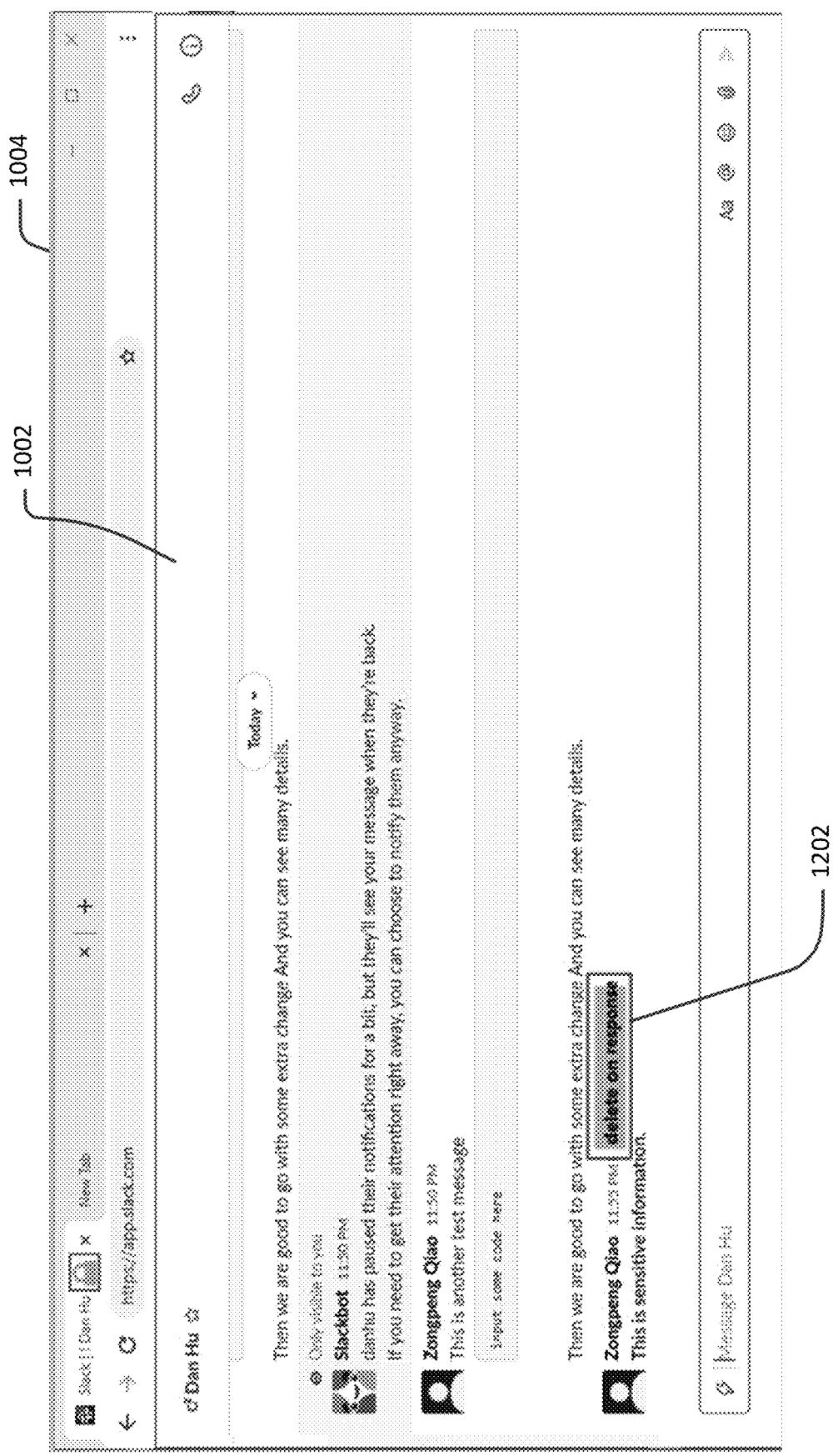
FIG. 12 is a screenshot illustrating an example collaboration services user interface (UI) showing a delete on response tag icon with an indication of a message, in accordance with an embodiment of the present disclosure.

FIG. 12 is a screenshot illustrating an example collaboration services user interface (UI) showing a delete on response tag icon with an indication of a message, in accordance with an embodiment of the present disclosure. The collaboration services UI (see reference numeral 1002) may be displayed within resource access application 424 UI (see reference numeral 1004) on client device 502 of user 508 (e.g., Dan Hu as shown in FIG. 12). The collaboration services UI (see reference numeral 1002) may include a delete on response tag icon (see reference numeral 1202) displayed next to an indication informing of an arrival of a message from Zongpeng Qiao sent at 11:55 PM. The delete on response tag icon (see reference numeral 1202) may be displayed next to the indication of the message from Zongpeng Qiao sent at 11:55 PM as an indication that this message is a secure message that will be deleted once the message is read and responded to.

Further Example Embodiments

The following examples pertain to further embodiments, from which numerous permutations and configurations will be apparent.

Example 1 includes a method including: receiving, by a computing device of a first user, a notification of an arrival of a message addressed to the first user from a second user; determining, by the computing device of the first user, that the message is a secure message; associating, by the computing device of the first user, a security tag icon to the message, the security tag icon providing an indication that the message is a secure message; and causing, by the computing device of the first user, a display of the associated security tag icon with a displayed indication of the arrival of the message.

Example 2 includes the subject matter of Example 1, wherein determining that the message is a secure message comprises querying a security profile associated with the second user.

Example 3 includes the subject matter of any of Examples 1 and 2, wherein the security tag icon is a delete on arrival tag icon.

Example 4 includes the subject matter of any of Examples 1 and 2, wherein the security tag icon is a delete on arrival tag icon, the method further including determining, by the computing device of the first user, that the message is read and, in response to a determination that the message is read, causing, by the computing device of the first user, a deletion of the message.

Example 5 includes the subject matter of Example 4, wherein causing the deletion of the message comprises, sending, by the computing device of the first user to a collaboration service, a request to delete the message.

Example 6 includes the subject matter of any of Examples 1 and 2, wherein the security tag icon is a delete on response tag icon.

Example 7 includes the subject matter of any of Examples 1 and 2, wherein the security tag icon is a delete on response tag icon, the method further including determining, by the computing device of the first user, that the message is responded to and, in response to a determination that the message is responded to, causing, by the computing device of the first user, a deletion of the message.

Example 8 includes the subject matter of any of Examples 1 and 2, wherein the security tag icon is a delete on response tag icon, the method further including determining, by the computing device of the first user, that the message is read and not responded to and, in response to a determination that the message is read and not responded to, causing, by the computing device of the first user, a deletion of the message after a predetermined period of time.

Example 9 includes the subject matter of Example 8, wherein the predetermined period of time is based on a size of the message.

Example 10 includes the subject matter of Example 8, wherein the predetermined period of time is based on historical usage data of the first user.

Example 11 includes the subject matter of any of Examples 7 through 10, wherein causing the deletion of the message comprises, sending, by the computing device of the first user to a collaboration service, a request to delete the message.

Example 12 includes a system including a memory and one or more processors in communication with the memory and configured to: receive a notification of an arrival of a message addressed to a first user from a second user; determine that the message is a secure message; associate a security tag icon to the message, the security tag icon configured to provide an indication that the message is a secure message; and cause a display of the associated security tag icon with a displayed indication of the arrival of the message.

Example 13 includes the subject matter of Example 12, wherein to determine that the message is a secure message comprises to query a security profile associated with the second user.

Example 14 includes the subject matter of any of Examples 12 and 13, wherein the security tag icon is a delete on arrival tag icon.

Example 15 includes the subject matter of any of Examples 12 and 13, wherein the security tag icon is a delete on arrival tag icon, and the one or more processors are further configured to determine that the message is read and cause a deletion of the message.

Example 16 includes the subject matter of Example 15, wherein to cause the deletion of the message comprises to send to a collaboration service a request to delete the message.

Example 17 includes the subject matter of any of Examples 12 and 13, wherein the security tag icon is a delete on response tag icon.

Example 18 includes the subject matter of any of Examples 12 and 13, wherein the security tag icon is a delete on response tag icon, and the one or more processors are further configured to determine that the message is responded to and cause a deletion of the message.

Example 19 includes the subject matter of any of Examples 12 and 13, wherein the security tag icon is a delete on response tag icon, and the one or more processors are further configured to determine that the message is read and not responded to and cause a deletion of the message after a predetermined period of time.

Example 20 includes the subject matter of Example 19, wherein the predetermined period of time is based on a size of the message.

Example 21 includes the subject matter of Example 19, wherein the predetermined period of time is based on historical usage data of the first user.

Example 22 includes the subject matter of any of Examples 18 through 21, wherein to cause the deletion of the message comprises to send to a collaboration service a request to delete the message.

Example 23 includes a method including: determining, by a computing device, that a message addressed to a first user from a second user is a secure message based on a query of a security profile associated with the second user, the security profile specifying whether messages from the second user are one of delete on arrival messages or delete on response messages; associating, by the computing device, a security tag icon to the message, the security tag icon providing an indication that the message is a secure message, the security tag icon is one of a delete on arrival tag icon or a delete on response tag icon; and causing, by the computing device, a display of the associated security tag icon with a displayed indication of the arrival of the message.

Example 24 includes the subject matter of Example 23, wherein the security tag icon is a delete on arrival tag icon, the method further including determining that the message is read and, in response to a determination that the message is read, causing a deletion of the message.

Example 25 includes the subject matter of Example 24, wherein causing the deletion of the message comprises sending to a collaboration service a request to delete the message.

Example 26 includes the subject matter of Example 23, wherein the security tag icon is a delete on response tag icon, the method further including determining that the message is responded to and, in response to a determination that the message is responded to, causing a deletion of the message.

Example 27 includes the subject matter of Example 23, wherein the security tag icon is a delete on response tag icon, the method further including determining that the message is read and not responded to and, in response to a determination that the message is read and not responded to, causing a deletion of the message after a predetermined period of time.

Example 28 includes the subject matter of Examples 27, wherein the predetermined period of time is based on a size of the message.

Example 29 includes the subject matter of Examples 27, wherein the predetermined period of time is based on historical usage data of the first user.

Example 30 includes the subject matter of any of Examples 26 through 29, wherein causing the deletion of the message comprises, sending to a collaboration service a request to delete the message.

Example 31 includes a system including a memory and one or more processors in communication with the memory and configured to: determine that a message addressed to a first user from a second user is a secure message based on a query of a security profile associated with the second user, the security profile specifying whether messages from the second user are one of delete on arrival messages or delete on response messages; associate a security tag icon to the message, the security tag icon providing an indication that the message is a secure message, the security tag icon is one of a delete on arrival tag icon or a delete on response tag icon; and cause a display of the associated security tag icon with a displayed indication of the arrival of the message.

Example 32 includes the subject matter of Example 31, wherein the security tag icon is a delete on arrival tag icon, and the one or more processors are further configured to determine that the message is read and cause a deletion of the message.

Example 33 includes the subject matter of Example 32, wherein to cause the deletion of the message comprises to send to a collaboration service a request to delete the message.

Example 34 includes the subject matter of Example 31, wherein the security tag icon is a delete on response tag icon, and the one or more processors are further configured to determine that the message is responded to and cause a deletion of the message.

Example 35 includes the subject matter of Example 31, wherein the security tag icon is a delete on response tag icon, and the one or more processors are further configured to determine that the message is read and not responded to and cause a deletion of the message after a predetermined period of time.

Example 36 includes the subject matter of Example 35, wherein the predetermined period of time is based on a size of the message.

Example 37 includes the subject matter of Example 35, wherein the predetermined period of time is based on historical usage data of the first user.

Example 38 includes the subject matter of any of Examples 34 through 37, wherein to cause the deletion of the message comprises to send to a collaboration service a request to delete the message.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
receiving, by a computing device of a first user, a notification of an arrival of a message addressed to the first user from a second user;
determining, by the computing device of the first user, that the message is a secure message;
associating, by the computing device of the first user, a security tag icon to the message wherein the security tag icon is a delete on response tag icon, and the security tag icon provides an indication that the message is a secure message;
causing, by the computing device of the first user, a display of the associated security tag icon with a displayed indication of the arrival of the message;
determining that the message is read and not responded to; and
deleting the message after a predetermined period of time based on the length of the message.

2. The method of claim 1, wherein the security tag icon is a delete on arrival tag icon.

3. The method of claim 1, wherein determining that the message is a secure message comprises querying a security profile associated with the second user.

4. The method of claim 1, wherein the security tag icon is a delete on arrival tag icon, the method further comprising:
determining, by the computing device of the first user, that the message is read; and
in response to a determination that the message is read, causing, by the computing device of the first user, a deletion of the message.

5. The method of claim 4, wherein causing the deletion of the message comprises, sending, by the computing device of the first user to a collaboration service, a request to delete the message.

6. The method of claim 1, wherein the predetermined period of time is based on historical usage data of the first user.

7. The method of claim 1, wherein causing the deletion of the message comprises, sending, by the computing device of the first user to a collaboration service, a request to delete the message.

8. A system comprising:
a memory; and
one or more processors in communication with the memory and configured to,
receive a notification of an arrival of a message addressed to a first user from a second user;
determine that the message is a secure message;
associate a security tag icon to the message, wherein the security tag icon is a delete on response tag icon, and
the security tag icon provides an indication that the message is a secure message;
cause a display of the associated security tag icon with a displayed indication of the arrival of the message;
determine that the message is read and not responded to;
delete the message after a predetermined period of time based on the length of the message.

9. The system of claim 8, wherein the security tag icon is one of a delete on arrival tag icon or a delete on response tag icon.

10. The system of claim 8, wherein the security tag icon is a delete on arrival tag icon, and wherein the one or more processors are further configured to: determine that the message is read; and cause a deletion of the message.

11. The system of claim 8, wherein the predetermined period of time is based on one of a size of the message or historical usage data of the first user.

* * * * *